May 28, 1957  E. E. OPEL  2,793,546
CONTROL MEANS FOR A MULTIPLE OPERATION MACHINE TOOL
Filed April 2, 1953  6 Sheets-Sheet 6
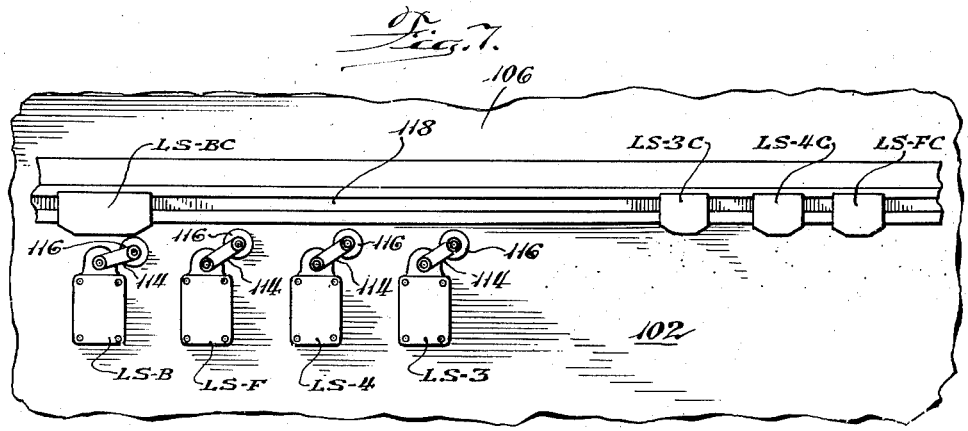
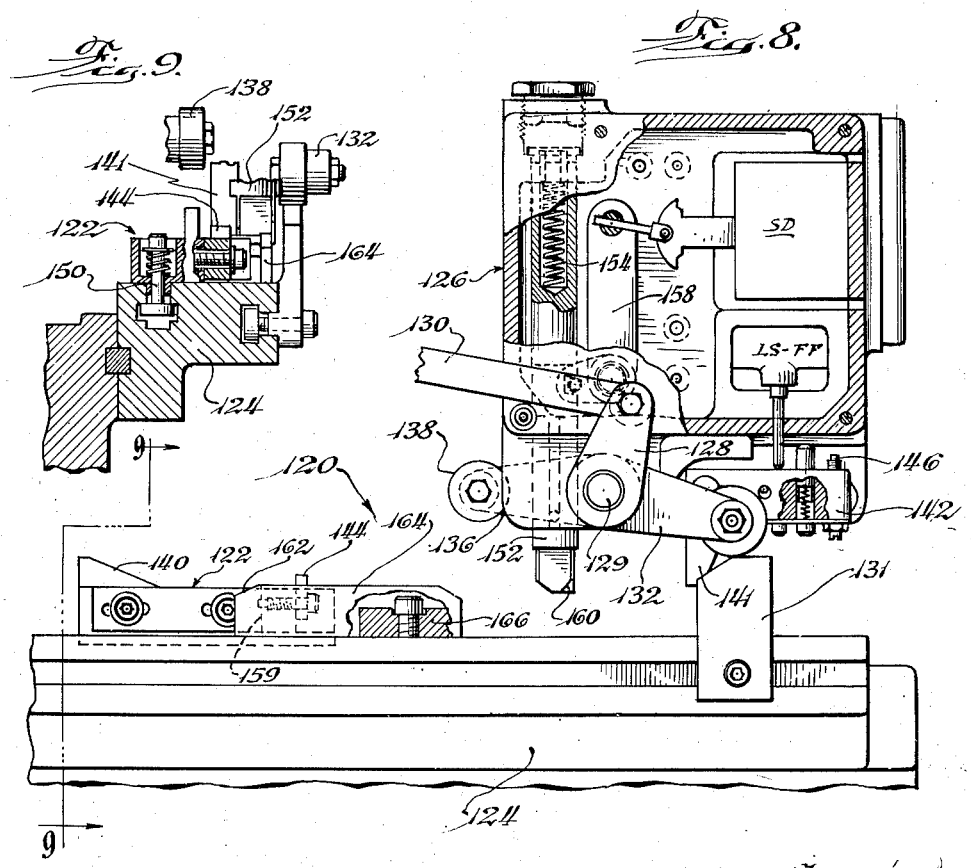

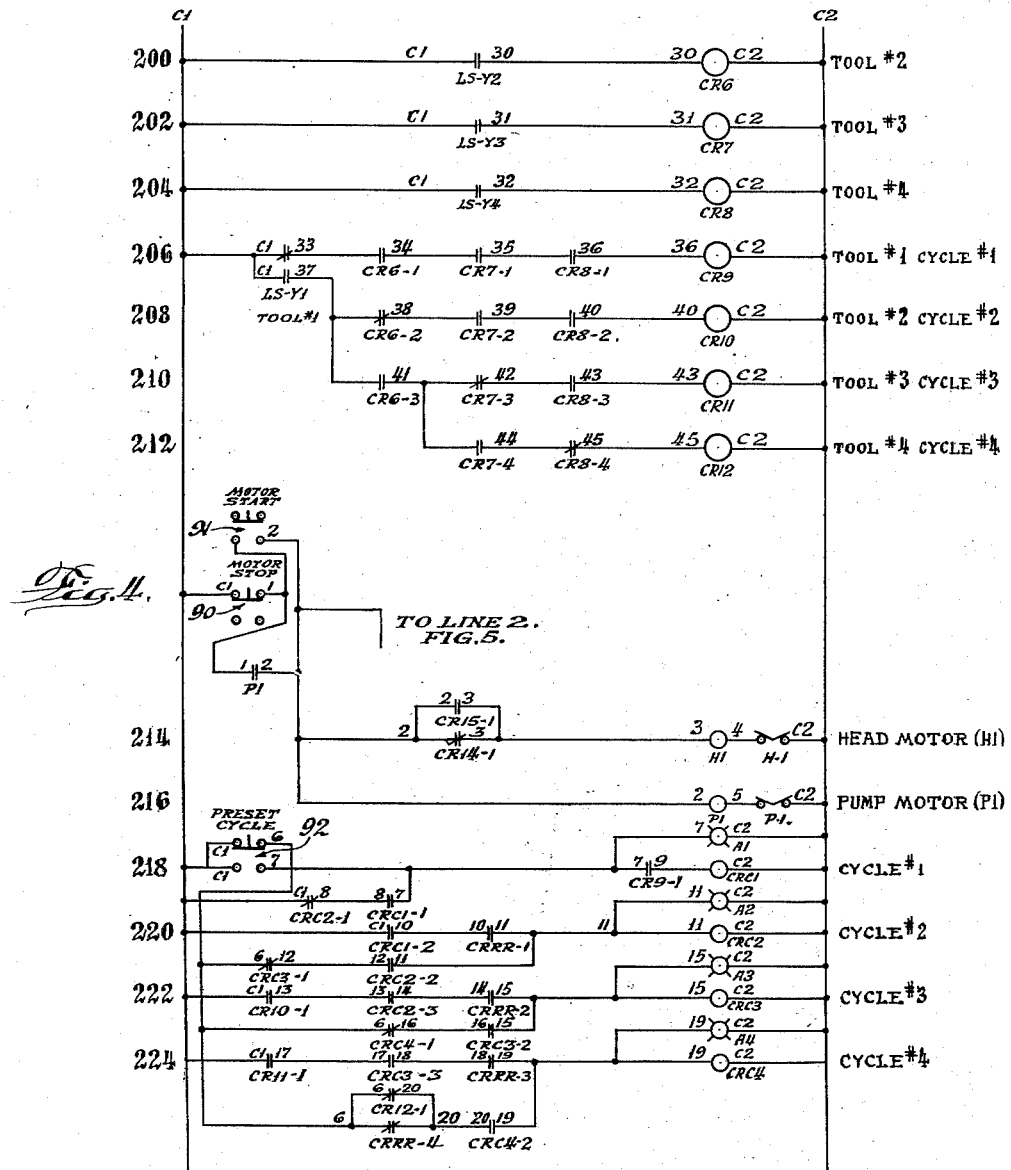

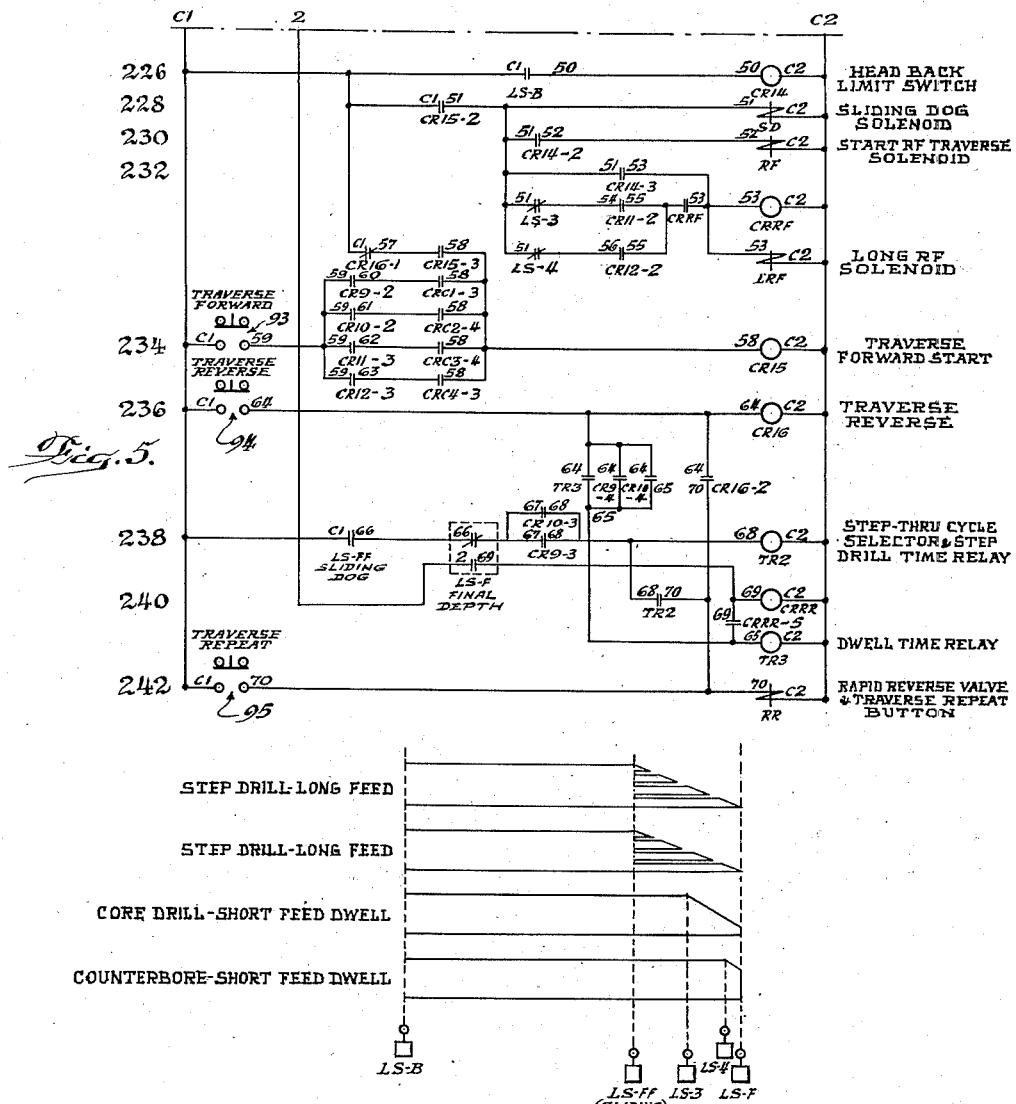

United States Patent Office 2,793,546
Patented May 28, 1957

2,793,546

CONTROL MEANS FOR A MULTIPLE OPERATION MACHINE TOOL

Earl E. Opel, Richmond, Ind., assignor to National Automatic Tool Company, Inc., Richmond, Ind., a corporation of Indiana Application April 2, 1953, Serial No. 346,490

9 Claims. (Cl. 77—5)

The present invention relates to improved control means for a machine tool adapted to perform a plurality of machining operations in a given order, the machine being fitted with different working tools for the successive operations.

In the use of such machines, damage to the workpiece or other trouble may arise by performing the various machining operations out of order, skipping one or more operations, or using the wrong tool for any given operation.

The general aim of the invention is to provide for a machine tool of this character a novel control which effectively avoids the above mentioned operational irregularities and generally simplifies the operation of the machine.

One object of the invention is to provide a novel control, for a multiple operation machine tool, which affords positive assurance not only that the successive operations are carried out in the correct order, beginning with the first operation, but also that the machine is fitted with the proper tool to perform each successive operation.

A more specific object is to provide for a multiple operation machine tool a novel control including a support rack for the tools used in the successive operations, the control serving to preclude performance of the various operations out of turn and being responsive to the positioning of tools in the rack to prevent carrying through any given machining operation with the wrong tool.

In conjunction with the foregoing objects, a further object is to provide a machine tool control of the above character which guides the operator in setting up the machine for any given operation by indicating the operation to be performed and the proper tool to be used.

Another object is to provide a machine tool control of the character recited in the preceding objects, which provides for automatic control of the machine during each machining operation.

Other objects and advantages of the invention will be apparent from the following description of the exemplary embodiment of the invention shown in the drawings, in which:

Fig. 4 is a diagrammatic illustration of a portion of the electrical means used in the machine tool control;

Fig. 5 is a diagrammatic illustration of another portion of the electrical control means;

Fig. 6 is a diagrammatic illustration of the successive machining operations performed by the illustrated machine tool;

Fig. 7 is a schematic view of control switch means mounted on one side of the machine tool;

Fig. 8 is a fragmentary view showing control switch means mounted on the other side of the machine tool; and Fig. 9 is a fragmentary sectional view taken along line 9—9 of Fig. 8, certain parts being broken away for clearness in illustration.

*General description of machine*

Figure 1:
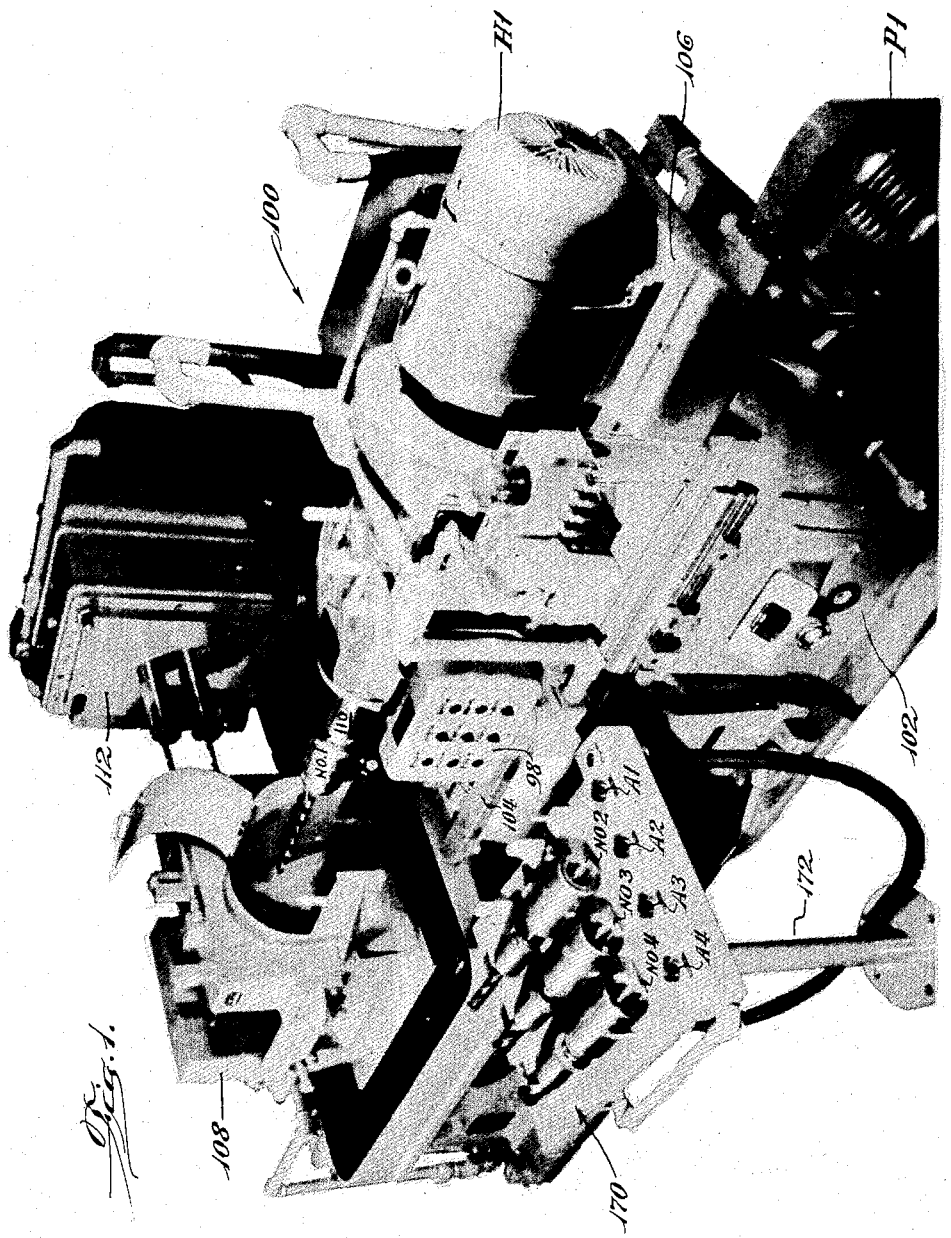
Figure 1 is a photographic, perspective view of a machine tool incorporating one form of the invention.
Figure 2:
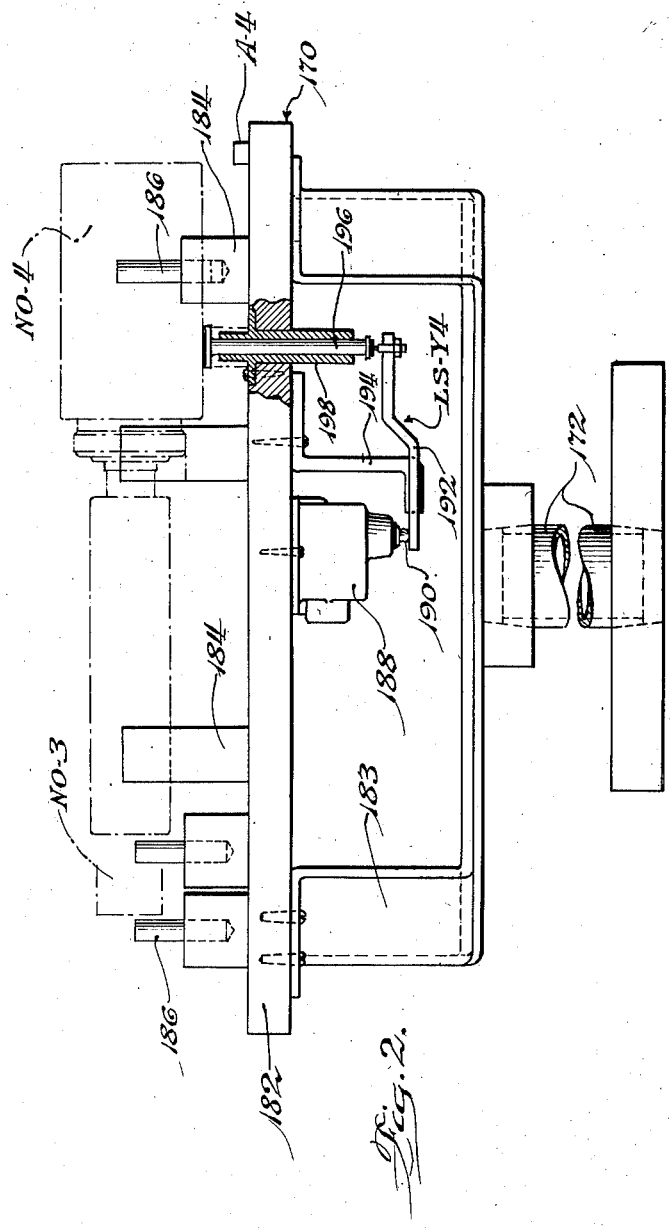
Fig. 2 is a side view of a tool rack of the machine tool control; certain parts of the rack are broken away for clearness in illustration and the positions of the tools in the rack are shown in phantom.
Figure 3:
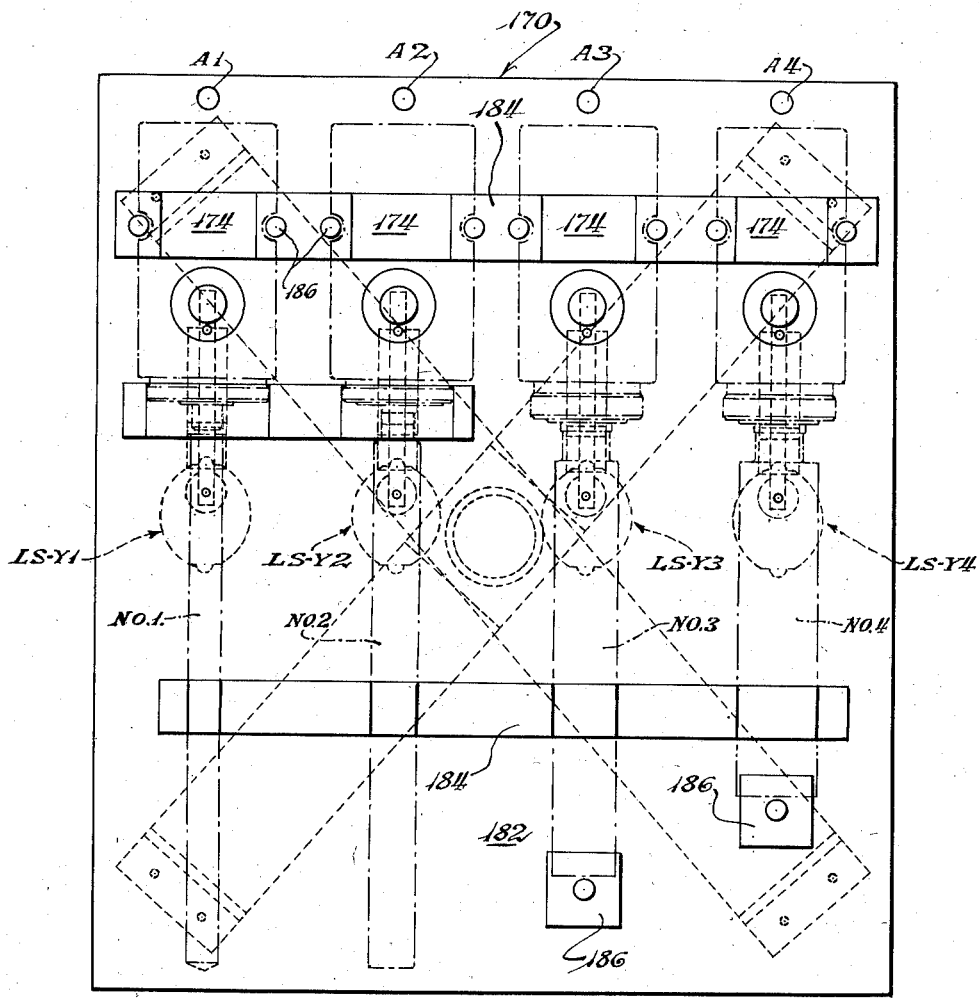
Fig. 3 is a top view of the rack shown in Fig. 2, tools in the rack being illustrated in phantom.

The illustrated form of the invention is applied to a horizontal drilling machine 100 comprising a support bed 102 having ways 104 slidably supporting a main drilling head 106. The head is moved toward and away from a workpiece holder 108 at one end of the ways by a suitable hydraulic transmission system powered by a pump motor P1. A tool spindle 110 in the forward end of the head 106 is rotated by a motor H1 on the rear of the head. A detailed description of the working mechanisms of the drilling machine is not necessary to a proper understanding of the invention. It is sufficient to say that the machine is capable of carrying out a succession of drilling and similar machining operations on a workpiece held in the holder 108.

Ordinarily it is necessary that the series of machining operations to be performed on a given workpiece be carried out in a predetermined order, a different working tool being attached to the rotary spindle 110 in the drilling head 106 for each successive operation. For the purpose of illustration, the drilling machine 100 is set up to perform a series of four machining operations on a workpiece, a set of four working tools, Nos. 1, 2, 3 and 4, being provided for the respective operations.

A secondary drilling head 112 mounted on the machine 100 for drilling holes at right angles to those drilled by the main head 102 has no direct relation to the invention.

*Description of cyclic control apparatus*

A series of limit switches used in controlling the machine 100 are mounted on the near side of the machine, as viewed in Fig. 1, to be actuated as an incident to translation of the head 106 along its support ways 104. This switching arrangement is shown schematically in Fig. 7. The four switches shown, LS-B, LS-3, LS-4, and LS-F, are mounted on the machine bed 102. A swingable operating arm 114 on each switch carries an actuating roller 116 on its free end.

Upon retraction of the drilling head 106 to its rearmost position, the limit switch LS-B is actuated by a cam LS-BC carried by a cam rail 118 on the drilling head 106. Limit switch LS-F is actuated by a cam LS-FC on the cam rail 118 upon forward movement of the head 106 to its final depth position. At intermediate points in the forward movement of the head 106 the limit switches LS-3 and LS-4 are actuated in turn by cams LS-3C and LS-4C on the cam rail 118. Suitable provision is made for adjusting the position of the switch cams on the rail 118 to provide flexibility in the operation of the machine.

A sliding dog control 120, shown in Figs. 8 and 9, is mounted on the far side of the machine, as viewed in Fig. 1, for use in carrying out step drilling operations and the like. Briefly, this control comprises a dog element 122 slidably mounted on an elongated rail 124 and a coacting control unit 126, the control unit and the rail being movable relative to each other upon movement of the head 106 along the ways 104. A rocker arm 128, fixed to a pivotal shaft 129 on the underside of the unit 126, is connected by a link 130 to suitable control valve means (not shown) for traversing the drilling head 106.

Upon rearward movement of the drilling head 106 to its fully retracted position, a cam 131 on the rail 124 engages a rearwardly extending actuating arm 132 on the shaft 129 to pivot the actuating arm upwardly and shift the rocker arm 128 to "neutral" position. Subsequent shifting of the traversing valve means to rapid forward feeding position by a solenoid actuator RF (Fig. 5) rotates the rocker arm 128 counterclockwise, as viewed in Fig. 8, to swing a forwardly projecting actuator arm 136 on the shaft 129 to a lowered position. Moving forward, a roller 138 carried by the actuator arm 136 engages an upwardly inclined cam surface 140 on the dog element 122 to shift the rocker arm 128 in a clockwise direction, with reference to Fig. 8, thereby actuating the hydraulic valve control to slow the forward movement of the head 106 to a feeding rate.

As feeding movement of the drilling head continues, the depending leg 141 of a bell crank actuator 142, pivoted to the underside of the control unit 126, engages a tang 144 on the dog element 122, thus pivoting the actuator counterclockwise to actuate a sliding dog limit switch LS–FF carried on the control unit 126. Pivotal movement of the actuator 142 is limited to a small angle by a stop 146 carried by a rearwardly projecting leg of the actuator, whereby the actuator acts on the tang 144 to carry the dog element 122 forwardly along the rail 124, leaving it in an advanced position upon return movement of the driving head. It will be noted that a frictional resistance to movement of the dog element 122 along the support rail 124 is induced by a spring biased bolt 150 slidably anchored in a T-slot within the rail.

Upon completion of a step drilling operation, the sliding dog element 122 is returned to its original position by a plunger 152 vertically slidable within the control unit 126 and biased downwardly by a spring 154. While a step drilling operation is in progress this plunger is held in a raised, inoperative position by a sliding dog solenoid SD connected to the plunger through a bell crank 158. When the sliding dog element 122 is to be returned to its original position the sliding dog solenoid SD is deenergized while the drilling head 106 is in a forward position, thus allowing the plunger 152 to drop downwardly to engage a return abutment 159 on the dog element. The plunger 152 then drags the dog element 122 back along the rail 124 to a positioning dog 164 anchored to the rail by a member 166. An inclined surface 162 on the positioning dog 164 engages an inclined surface 160 on the plunger 152, camming the plunger upwardly above the return abutment 159 to leave the sliding dog 122 in its original starting position.

The control system for the machine 100 includes a tool rack 170 supported on a pedestal 172 alongside the machine and equipped with four receivers 174 designed to hold the respective cutting tools No. 1, No. 2, No. 3 and No. 4 used in the successive machining operations, the receivers being so designed that each tool will fit properly only in its own receiver. Structurally, the tool rack 170 shown comprises a flat plate 182 supported on the upper end of the pedestal 172 by a spider 183. Two members 184 extending across the plate are suitably recessed to form the respective receivers 174. Additional members 186 are located on the rack to aid in positioning the cutting tools in the proper receivers.

Four control or limit switches of similar construction, LS–Y1, LS–Y2, LS–Y3, and LS–Y4, are mounted on the rack 170 to sense the presence of the cutting tools in the respective receivers 174. A typical switch, LS–Y4, comprises a switch element 188 fixed to the underside of a rack plate 182 to be opened and closed by reverse movement of a downwardly biased pin 190. An elongated actuator 192 engages the pin 190 and extends through a fulcrum bracket 194 on the underside of the plate 182 to connect with the lower end of a vertically movable plunger 196. This plunger extends upwardly through a sleeve 198 in the plate 182 to be engaged by the No. 4 working tool when the latter is positioned in its overlying receiver 174.

Four indicating lamps, A1, A2, A3 and A4, are positioned on a tool rack 170 to indicate to the operator the proper working tool to be removed from the rack and placed on the driving spindle 110 for the machining operation at hand.

The electrical control system incorporated into the drilling machine 100 in combination with the tool rack 170 to assure that a predetermined series of machining operations are carried out in proper order beginning always with the first operation and using the proper one of the working tools for each operation, is shown diagrammatically in Figs. 4 and 5. As diagrammatically illustrated, the control means comprises two power leads, C1 and C2, bridged by a series of generally parallel circuit sections that for convenience in description have been numbered as indicated at the left of the diagrams.

Running down the diagrammatic layout of the controls, starting from the top of Fig. 4 and tracing the circuits from line C1 on the left to line C2 on the right, the first circuit section 200 includes the limit switch LS–Y2, conductor 30, and relay CR6.

As to the symbolism used in the drawings, it will be noted that switches which normally seek an open position are indicated by two short, parallel, vertical lines; switches which seek a normally closed position are indicated with the same symbol but with a diagonal crossline added. For the sake of brevity the various circuit sections of the control circuits will be referred to as "sections." The next section 202 comprises the tool switch LS–Y3, conductor 31, and relay CR7. Similarly, a section 204 includes the tool switch LS–Y4, conductor 32, and relay CR8. The following section 206 is made up of normally closed contacts of tool switch LS–Y1, conductor 33, relay switch CR6–1, conductor 34, relay switch CR7–1, conductor 35, relay switch CR8–1, conductor 36, and relay CR9. Under this is section 208 comprising normally open contacts of tool switch LS–Y1, conductor 37, relay switch CR6–2, conductor 38, relay switch CR7–2, conductor 39, relay switch CR8–2, conductor 40, and relay CR10. A branch section 210 from section 208 comprises conductor 37, relay switch CR6–3, conductor 41, relay switch CR7–3, conductor 42, relay switch CR8–3, conductor 43, and relay CR11. A second branch section includes conductor 41, relay switch CR7–4, conductor 44, relay switch CR8–4, conductor 45, and relay CR12.

The electrical controls specifically described thus far are responsive to the positioning of cutting tools in the rack 170 and may be designated generally as "follow-up" circuit means. Explanatory legends indicating the correlation of this circuit means with the tools in the rack appear at the right of the diagram.

The circuits for the head motor H1 and the pump motor P1 appear in Fig. 4 just below the follow-up circuit means. The head motor circuit comprises section 214 including motor stop switch 90, conductor 1, conductor 2, motor start switch 91 and relay switch P1 connected in parallel between conductor 1 and conductor 2, conductor 3, relay switch CR15–1 and relay switch CR14–1 connected in parallel between conductor 2 and conductor 3, head motor starter overload relay H1, conductor 4, and head motor H1. Branching from section 214 the pump motor section 216 comprises conductor 2, pump motor starter overload relay P1, conductor 5, and pump motor P1.

Sequencing circuit means grouped below the motor circuits in Fig. 4 begin with section 218 comprising normally open contacts of pre-set cycle switch 92, conductor 7, relay switch CR9–1, conductor 9, and relay CRC1. Indicating lamp A1 is interposed in a branch connection from conductor 7 to line C2. A second lead-in connection from line C1 to conductor 7 includes relay switch CRC2–1, conductor 8, and relay switch CRC1–1.

The next main section 220 includes relay switch CRC1–2, conductor 10, relay switch CRRR–1, conductor 11, and indicating lamp A2 and relay CRC2 connected in parallel between conductor 11 and line C2. A second lead-in from line C1 to conductor 11 comprises the normally closed contacts of preset cycle switch 92, conductor 6, relay switch CRC3–1, conductor 12, and relay switch CRC2–2. Similarly, section 222 includes relay switch CR10–1, conductor 13, relay switch CRC2–3, conductor 14, relay switch CRRR–2, conductor 15, and indicating lamp A3 and relay CRC3 connected in parallel between conductor 15 and line C2. A second lead-in to conductor 15 from line C1 is effected through previously mentioned conductor 6, relay switch CRC4–1, conductor 16, and relay switch CRC3–2.

The fourth and last section 224 of the sequencing circuit means includes relay switch CR11–1, conductor 17, relay switch CRC3–3, conductor 18, relay switch CRRR–3, conductor 19, and indicating lamp A4 and relay CRC4 connected in parallel between conductor 19 and line C2. A second lead-in from line C1 to conductor 19 comprises previously mentioned conductor 6, conductor 20, relay switch CR12–1 and relay switch CRRR–4 connected in parallel between conductor 6 and conductor 20, and relay switch CRC4–2.

Figure 5 is actually a continuation of the diagrammatic illustration of Fig. 4. The cycle control circuit means illustrated in Fig. 5 are used in conjunction with the circuit means of Fig. 4 for carrying out the individual machining operations in the prescribed order. The first section 226 starting from the top of Fig. 5, comprises limit switch LS–B, conductor 50, and relay CR14.

The next section 228 comprises relay switch CR15–2, conductor 51, and sliding dog solenoid SD. A first branch section 230 from conductor 51 to line C2 comprises relay switch CR14–2, conductor 52, and rapid forward solenoid RF. A second branch section 232 from conductor 51 to line C2 comprises relay switch CR14–3, conductor 53, and relay CRRF and long rapid forward solenoid LRF connected in parallel between conductor 53 and line C2. A first tie-in connection between conductor 51 and conductor 53 includes limit switch LS–3, conductor 54, relay switch CR11–2, conductor 55, and relay switch CRRF. A tie-in connection between conductor 51 and conductor 55 comprises limit switch LS–4, conductor 56, and relay switch CR12–2.

The next main circuit section between line C1 and line C2 comprises traverse forward switch 93, conductor 59, and relay CR15; the two conductors 59 and 58 being interconnected by four bridging connections as follows: first, relay switch CR9–2, conductor 60, and relay switch CRC1–3; second, relay switch CR10–2, conductor 61, and relay switch CRC2–4; third, relay CR11–3, conductor 62, and relay switch CRC3–4; and fourth, relay switch CR12–3, conductor 63, and relay switch CRC4–3. An additional lead-in from the line C1 to conductor 58 includes relay switch CR16–1, conductor 57, and relay switch CR15–3.

Section 236 comprises traverse reverse switch 94, conductor 64, and relay CR16. Farther down, section 238 includes sliding dog limit switch LS–FF, conductor 66, normally closed contacts of final depth switch LS–F, conductor 67, conductor 68, relay switch CR10–3 and CR9–3 connected in parallel between conductors 67 and 68, and time delay relay TR2.

This is followed by section 240 including conductor 2 (also included in section 214, Fig. 4), normally open contacts of final depth switch LS–F, conductor 69, and relay CRRR. A branch connection from conductor 69 to line C2 includes relay switch CRRR–5, conductor 65, and dwell time relay TR3. Conductor 65 of this branch connection is connected to conductor 64 of section 236 through three parallel switches TR3, CR9, and CR10–4.

The last section 242 includes traverse repeat switch 95, conductor 70, and rapid reverse solenoid RR. Conductor 70 of this section is connected to conductor 64 of section 236 through relay switch CR16–2 and to conductor 68 of section 238 through time relay switch TR2.

The motor stop switch 90, motor start switch 91, preset cycle switch 92, traverse forward switch 93, traverse reverse switch 94, and traverse repeat switch 95 are grouped together on a control panel 98 conveniently located on the machine 100, Fig. 1.

*Operation*

The four machining operations performed by the machine 100 are illustrated diagrammatically in Fig. 6. The first two of these are step drilling operations using tools No. 1 and No. 2. In the third operation, tool No. 3, a core drill, is used through a cycle including a relatively short feeding stroke followed by a dwell period at final depth. The fourth operation is a generally similar machining cycle using tool No. 4, a counterboring tool.

To follow through this series of operations, it is helpful to assume normal starting conditions with the pump motor P1 and the head motor H1 stopped. The drilling head 106 is in its fully retracted position, closing limit switch LS–B of circuit section 226 (see Figs. 5 and 7) and shifting rocker arm 128 to neutral position, Fig. 8. All four working tools, Nos. 1, 2, 3 and 4 are positioned in the rack 170.

In making ready for the first operation the operator starts the pump motor P1 by closing motor start switch 91 to complete a circuit through section 216 which includes the pump motor. This energizes relay P1 closing switch P1 between conductors 1 and 2 to maintain the circuit through section 216 after the motor start switch 91 is released. It will be noted that the head motor H1 in section 214 is not started at this time, the switch CR15–1 being biased to open position and switch CR14–1 being held open by its energized relay CR14, section 226.

Either before or after starting the pump motor P1, the operator loads a workpiece into the holder 108 on the machine.

Before the machine 100 can be put into operation, it is necessary that relay CR15, section 234, be energized to close switch CR15–1, section 214, through which the head motor H1 is energized and to close switch CR15–2, section 228, through which the forward traverse solenoid RF, section 230, is energized. As will be later demonstrated, relay CR15 can be energized only after tool No. 1 has been removed from the rack 170 and the other three tools are resting in their receivers 174.

When tool No. 1 has been removed from the rack 170 and placed on the machine spindle 110, double circuit limit switch LS–Y1 opens the connection from line C1 to conductor 37, section 208, preventing energization of relays CR10, CR11, and CR12. At the same time switch LS–Y1 closes section 206 to energize relay CR9. Relay switches CR6–1, CR7–1, and CR8–1 in section 206 are closed by relays CR6, CR7 and CR8 which are energized respectively through switches LS–Y2, LS–Y3, and LS–Y4 that are closed by toools Nos. 2, 3 and 4 remaining in the rack 170. Energization of relay CR9 closes relay switch CR9–1, section 218, thereby preconditioning the sequencing circuit means to permit the first machining operation to be carried out.

After placing tool No. 1 on the spindle 110, the operator presses preset cycle switch 92 connecting line C1 with conductor 7 in section 218 to energize relay CRC1 through closed switch CR9–1. This also energizes indicator light A1 to indicate that the first machining operation is to be carried out. Relay CRC1 immediately closes switch CRC1–1 to hold a connection from line C1 through closed switch CRC2–1, and conductor 8 to conductor 7, thereby maintaining the circuit through relay CRC1 after the preset switch 92 is released.

Relay CRC1 also closes switch CRC1–3 in section 234. Switch CR9–2 in series with this switch has been previously closed upon energization of relay CR9, section 206.

The operator may then begin the first machining operation at will by pressing the traverse forward switch 93 in section 234 to complete a circuit through closed relay switches CR9–2 and CRC1–3 to energize relay CR15. Relay CR15 then operates to preserve its own energization by closing switch CR15–3 to tie in conductor 58 to line C1 through closed switch CR16–1.

At the same time relay CR15 closes switch CR15–2 in section 228 energizing sliding dog solenoid SD to condition the machine for carrying out step drilling operations as previously explained.

Simultaneously with this, the rapid forward solenoid RF in section 230 is energized through closed switch CR15–2 and switch CR14–2 closed by relay CR14, section 226. Switch LS–B in series with relay CR14 is closed since the drilling head 106 is in fully retracted position. The solenoid RF operates to shift a suitable control valve in the hydraulic head traversing system to rapid forward position where it is latched mechanically.

It may be noted that closure of switch CR15–2 in section 228 energizes relay CRRF and long rapid forward solenoid LRF in circuit section 232 until switch CR14–3 in section 232 is opened as an incident to forward movement of the drilling head 106 away from its fully retracted position. However, such momentary energization of these elements is of no consequence since they serve no function in the first and second machining operations.

Energization of the relay CR15, effected by pressing the traverse forward switch 93 as previously described, closes switch CR15–1 in section 214 to start the head motor H1.

After the traverse forward switch 93 is closed, the machine 100 is operated automatically to complete the first machining operation. Thus, with the spindle 110 turning, the drilling head 106 moves rapidly forward until the actuator roller 138 engages sliding dog cam 140, Fig. 8, to slow the head to a feeding rate.

At this juncture the actuator 142, Fig. 8, engages the sliding dog tang 144 to close limit switch LS–FF, electrically interposed in section 238. This completes a circuit through closed contacts of limit switch LS–F and closed switch CR9–3 to energize time relay TR2. After a predetermined drilling period, relay TR2 closes to connect energized conductor 68 of section 238 with conductor 70 of section 240 to energize rapid reverse valve solenoid RR to return the drilling head 106 to fully retracted position.

Return of the head 106 to this position mechanically closes limit switch LS–B to energize control relay CR14. This closes switch CR14–2 in section 230 to again energize the rapid forward solenoid RF, starting the drilling head 106 once more on a feeding stroke. The machine continues step drilling in this manner until the drilling head 106 reaches its final depth position operating limit switch LS–F.

Operation of final depth switch LS–F breaks the circuit through section 238 to drop out time delay relay TR2. At the same time this double circuit switch LS–F energizes relay CRRR, section 240. This immediately closes relay switch CRRR–5 to connect conductor 69 of section 240 with conductor 65 to energize relay CR16 in section 236 through conductor 64 and closed relay switch CR9–4.

Energization of relay CR16 immediately breaks the circuit through relay CR15, section 234, by opening relay switch CR16–1 connecting the relay with line C1. Deenergization of relay CR15 opens switch CR15–2 in section 228 to break the circuit through the sliding dog solenoid SD. As previously mentioned this allows the plunger 152, Fig. 8, to drop downwardly to return the sliding dog 122 to its original position. Deenergization of relay CR15 also opens switch CR15–1 in the head motor section 214.

Further, relay CR16 closes switch CR16–2 to connect energized conductor 64 of section 236 with conductor 70 of section 242 to energize solenoid RR to return the head 106 to fully retracted position. Relay CRRR is deenergized by operation of switch LS–F as soon as the drilling head 106 is on its way to retracted position.

When the drilling head 106 reaches its fully retracted position, relay CR14 is energized through switch LS–B, thus, opening switch CR14–1 in section 214 to stop the head motor H1. This completes the first machining operation or cycle.

As an incident to the completion of the first machining operation the control system is preconditioned to carry out the second machining operation and no other. Thus, the brief energization of relay CRRR at the end of the first machining operation closes relay switch CRRR–1 in section 220 to complete the circuit through closed relay switch CRC1–2 (relay CRC1 in circuit section 218 having been energized from the beginning of the first machining operation) to energize relay CRC2. This turns on indicator light A2, connected in parallel with relay CRC2, to indicate on the tool rack 170 the next machining to be performed and the proper tool to be used. Once energized, the relay CRC2 closes switch CRC2–2 to maintain its own energization through closed contacts of switch 92 and closed switch CRC3–1 after the relay switch CRRR–1 opens.

Energization of relay CRC2 automatically deenergizes relay CRC1 in section 218 by opening the relay switch CRC2–1 in this section. The effect of this is to open switch CRC1–3 between conductor 60 and conductor 58 in section 234. At this same time, however, the relay switch CRC2–4 in the same circuit section 234 is closed by relay CRC2 thus preconditioning the section 234 to energize the relay CR15 to put the machine into operation upon closure of relay switch CR10–2 in series with closed relay switch CRC2–4 and pressing of the traverse forward switch 93. In other words, the machine will be all set to go upon closure of relay switch CR10–2 in section 234. As it will appear, the necessary closing of this switch CR10–2 can be brought about only by making the proper change of working tools for the next machining operation. This sequence of controlling action takes place automatically.

All the operator is required to do between machining operations is to remove tool No. 1 from the spindle 110, return it to its receiver 174 on the rack 170, remove tool No. 2 from the rack (being guided by indicating light A2 in the selection of the tool), mount this tool on the spindle, and again press the traverse forward switch 93. It is as simple as that.

Now to trace the operation of the control system as the machine 100 is set up for the second machining operation. Upon return of tool No. 1 to its receiver 174 the double circuit switch LS–Y1 operates to break the circuit in section 206 thus deenergizing relay CR9. This opens switch CR9–1 in section 218 and switch CR9–2 in section 234. Operation of limit switch LS–Y1 also connects line C1 to conductor 37, a component of sections 208, 210, and 212.

Removal of tool No. 2 from the rack 170 allows limit switch LS–Y2 to open, section 200, deenergizing relay CR6. Deenergization of relay CR6 opens switch CR6–3 to preclude energization of control relays CR11 and CR12 and allows relay switch CR6–2 in section 208 to close. Switch CR6–2 completes a circuit through relay CR10, section 208, switches CR7–2 and CR8–2 being closed by energized relays CR7 and CR8. This energization of relay CR10 closes relay switch CR10–2 in series with closed relay switch CRC2–4 in section 234.

Upon closure of traverse forward switch 93 relay CR15, section 234, is energized and the second machining operation is carried through in the same manner as the first operation. It is fitting to note, however, that during the second operation the connection between conductors 67 and 68 in section 238 is effected through relay switch CR10-3 rather than switch CR9-3. Similarly, the connection between conductor 65 of section 240 and conductor 64 of section 236 is made through switch CR10-4 rather than switch CR9-4. These differences, however, do not affect the operation of the control system.

Energization of relay CRRR in section 240 in the final phase of the second machining operation preconditions the sequencing controls of Fig. 4 for carrying out the third operation. More particularly, the relay closes switch CRRR-2 in section 222 to complete a circuit through closed relay switch CR10-1 and closed relay switch CRC2-3 to energize relay CRC3 and indicator light A3. Relay CRC3 closes relay switch CRC3-2 to maintain the energization of the relay through closed contacts of switch 92 and closed relay switch CRC4-1. The relay CRC3 also turns out the indicator light A2 and deenergizes the relay CRC2 by opening the switch CRC3-1 in section 220. This opens the relay switch CRC2-4 and closes the relay switch CRC3-4 in section 234 for carrying through the third operation.

The operator returns tool No. 2 to the rack 170 and places tool No. 3, a core drill, on the spindle 110. The machine 100 is then ready to carry out the third machining operation, which happens to be a continuous rather than a step drilling cycle.

This change of tools closes limit switch LS-Y2 to energize relay CR6 in section 200 and opens switch LS-Y3 to deenergize the relay CR7 in section 202. This establishes a circuit from line C1 through closed contacts of switch LS-Y1, closed relay switch CR6-3, closed relay switch CR7-3, and closed relay switch CR8-3 to energize relay CR11. The open relay switches CR7-1, CR7-2, and CR7-4 in sections 206, 208 and 212 prevent energization of relays CR9, CR10 and CR12. Relay CR11 closes relay switch CR11-3 in series with closed switch CRC3-4 in section 234.

Upon closing of traverse forward switch 93, the relay CR15 is energized to start the head motor H1 and initiate rapid forward movement of the drilling head 106. In this cycle, the energization of relay CRRF in section 232, first effected through closed switch CR14-3 and CR15-2 is maintained through closed switch LS-3, switch CR11-2 (previously closed upon energization of relay CR11) and a closing of switch CRRF. This also maintains the energization of long rapid forward solenoid LRS connected in parallel with relay CRRF.

With the long rapid forward solenoid LRS energized and acting on the control valves for traversing the head 106, the head moves rapid forward on past the sliding dog 122 to bring the working tool close to the workpiece. The limit switch LS-3 is mechanically opened to open circuit section 232 thereby deenergizing relay CRRF and opening relay switch CRRF. This discontinues the energization of the long rapid forward solenoid LRS causing the forward movement of the head 106 to slow to a regular feeding rate, as indicated diagrammatically in Fig. 6. It will be noted that a closing of switch LS-FF by the sliding dog 122 has no effect except in the first and second machining operations when one of the parallel switches CR9-3, CR10-3 in section 238 is closed.

The drilling head 106 moves forward at the regular feed rate until final depth switch LS-F operates to close section 240 energizing relay CRRR. This closes switch CRRR-5 between conductor 69 and conductor 65 to energize the dwell time relay TR3.

After a predetermined period, relay TR3 operates to close relay switch TR3 between conductor 65 and conductor 64 to energize relay CR16 in section 236. Energization of relay CR16 operates to return the drilling head 106 to its fully retracted position and shut off the head motor H1 to complete the third machining operation in the same manner that the first and second machining operations were concluded.

Energization of the relay CRRR in the final phase of the third machining operation advances the sequencing controls to carry out the fourth operation. Switch CRRR-3 in section 224 closes to complete a circuit through closed relay switch CR11-1, and closed relay switch CRC3-3 to energize relay CRC4 and indicator light A4. Relay CRC4 operates to close relay switch CRC4-2 to tie in the relay to energized conductor 6 through closed relay switch CR12-1. At the same time, relay CRC4 opens switch CRC4-1 to deenergize relay CRC3, section 222. Switch CRC3-4 is opened and switch CRC4-3 is closed in section 234 in preparation for the fourth and last machining operation.

The substitution of tool No. 4 for tool No. 3 on the spindle 110 energizes relay CR7 in section 202 and deenergizes relay CR8, section 204, to deenergize relay CR11 and complete a circuit from energized conductor 41 in section 210 through closed relay switches CR7-4 and CR8-4 to energize relay CR12. This closes switch CR12-3 in section 234 to put the control system in readiness for carrying out the fourth machining operation upon actuation of the forward traverse switch 93. It will be noted that relay switch CRRR-4 in section 224 is now closed to maintain the circuit in this section after switch CR12-1 is opened.

The fourth machining operation is essentially the same as the third machining operation except for the use of a shorter counterboring tool in place of the core drill tool used in the third operation. However, the limit switch LS-3, section 232, used in the third operation is rendered ineffective in the fourth operation by the then open relay switch CR11-2 in series with this limit switch. Thus, drilling head 106 moves rapid forward on past the limit switch LS-3 to the limit switch LS-4, section 232, which is connected in series with closed relay switch CR12-2 to energize the long rapid forward solenoid LRF. Actuation of the limit switch LS-4 breaks the circuit through the solenoid LRF to slow the drilling head to a feeding rate.

Operation of the final depth switch LS-F energizes the drill time relay TR3 as in the third machining operation to return the head 106 to its fully retracted position, completing the series of machining operations.

Energization of the relay CRRR, section 240, in the final phase of the fourth machining operation opens relay switch CRRR-4 in section 224 to turn out the indicator light A4 and deenergize the relay CRC4, opening the switch CRC4-3 in section 234.

Thus all the indicating lights A1 through A4 are out, indicating that the operator must start again with the first machining operation which is ordinarily performed on a new workpiece.

It will now be appreciated that since the sequencing controls, illustrated in the lower portion of Fig. 4, can, with the exception of the first cycle control which is brought into operation by the preset cycle switch 92, be conditioned for operating the machine only upon completion of the next preceding machining operation. The operator, therefore, must always begin with the first operation and then complete the operations in order, using the proper tool for each operation.

If, before completing the entire series of machining operations, the operator should desire to start over from the beginning, he may do so by first pressing the preset cycle switch 92 to clear the sequencing circuits for carrying out the first operation.

Should the operator desire to start over any one machining operation before it has been completed, he may do so by actuating the traverse reverse switch 94 in section 236 to energize the control relay CR16 to return the drilling head 106 to its retracted position and stop the spindle motor as though the machining operation has been completed, but with the control system still conditioned for carrying out the same operation from the beginning, since the relay CRRR is not energized. This gives the operator an opportunity to inspect the working tool, take time out, or the like, beginning anew the machining operation previously in progress, merely by actuating traverse forward switch 93.

In the event the operator should desire to retract the working tool from the workpiece without interrupting the automatic operation of the machine, he can do so by closing traverse repeat switch 95, section 242, thereby energizing rapid reverse relay RR to return the drilling head 102 to fully retracted position where the limit switch LS–B energizes relay CR14, section 226, to close relay switch CR14–2 to energize rapid forward traverse solenoil RF, section 230, to automatically return the head 106 into operation.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. Means for controlling a machine tool to perform a succession of machining operations in a predetermined order using only the proper tools of a set for the respective operations, said control comprising, in combination, means defining a plurality of receivers adapted to hold the respective tools used in the successive machining operations, a plurality of control switches associated with said respective receivers to sense the presence of working tools therein, cyclic circuit means for controlling the machine tool through the respective machining operations, sequencing circuit means interconnected with said cyclic circuit means for cooperation with the machine to establish the order in which said machining operations must be carried out and determining the proper tools which must be selected from said rack for performing the respective operations, and follow-up circuit means interconnected with said control switches and said cyclic circuit means for preconditioning the latter to carry out a machining operation upon the removal of only the proper tool from said receiver means for the operation.

2. In a machine tool for performing a series of machining operations using a succession of tools, the combination of cyclic control means for operating the machine tool during the various machining operations, sequencing circuit means interconnected with said cyclic circuit means for establishing the order in which said machining operations must be carried out and determining the tool which must be employed in each successive machining operation, a support rack having a plurality of receivers adapted to hold the respective tools to be used in said machining operations, a plurality of control switches associated with said respective receivers to sense the presence of tools therein, and follow-up circuit means interconnected with said switches and said cyclic circuit means for preconditioning the latter to carry out a machining operation when only the proper tool therefor has been selected from said rack.

3. In a machine tool for carrying out a series of machining operations in a predetermined order using a succession of cutting tools, the combination of control circuit means for said machine tool including a circuit section operative upon energization thereof to initiate operation of said machine tool, said circuit section including a parallel arrangement of sequencing switches corresponding to the respective machining operations of said series and a plurality of follow-up switches connected in series with said respective sequencing switches and corresponding to the respective cutting tools used in said operation, sequencing circuit means including a series of circuit sections interconnected with said respective sequencing switches, said sequencing circuit sections being energizable only in sequence beginning with the first section thereof, means on said machine tool interconnected with said sequencing circuit means to respond to completion of a machining operation of said series to cause energization of the next successive one of said sequencing circuit sections and a closing of the sequencing switch corresponding to the next successive operation, rack means defining a plurality of receivers for holding the respective cutting tools, and follow-up means associated with said receivers and interconnected with said respective follow-up switches for closing the latter in response to removal of only the respective tools from said receivers.

4. In a machine tool for carrying out a series of machining operations in a predetermined order using a succession of working tools, the combination of control circuit means for said machine tool including a circuit section operative upon energization thereof to initiate operation of the machine tool, said control circuit section including a plurality of parallel sequencing switches and a plurality of follow-up switches in series with said respective sequencing switches, sequencing circuit means interconnected with said sequencing switches, rack means defining a plurality of receivers for holding the respective working tools, follow-up means associated with said receivers and interconnected with said follow-up switches, and means on said machine tool interconnected with said sequencing means to condition the latter as an incident to completion of a machining operation of said series to close the one of said sequencing switches corresponding to the next successive machining operation, said follow-up means operating to close the follow-up switch in series with the closed one of said sequencing switches in response to removal of only the proper tool for the next machining operation from said rack means.

5. In a machine tool for performing a series of machining operations using a succession of working tools in a predetermined order, the combination of machining structure, a support rack mechanically unrelated to the machining structure as such and defining a series of receivers for the respective working tools to be used in the successive machining operation, sensing means responsive to the presence of working tools in the respective receivers, control means interconnected between the sensing means and the machining structure for preventing effective operation of the latter when more than one working tool is removed from the rack, and sequencing means in the control means requiring as a condition for operating the machining structure upon removal from the rack of any tool except the first in the series the removal from and replacement in the rack of the next preceding tool of the series.

6. In a single spindle machine tool for performing a series of machining operations using a plurality of tools in a predetermined sequence, the combination comprising, a support rack having a plurality of tool receivers adapted to hold the respective working tools to be used successively in said machining operations, a plurality of control switches on said rack, switch operating means connecting each one of said switches with an individual one of said tool receivers so that a tool in said receiver operates said switch to indicate the presence of the tool in said receiver, cyclic control circuit means for operating the machine tool, sequencing circuit means interconnected with said cyclic control circuit means for determining the exact order in which the machining operations are to be carried out and the proper working tool to be used in each operation, and follow-up circuit means interconnected with said switches and said cyclic control circuit means for preconditioning the latter to initiate a machining operation when only the proper working tool has been removed from said rack.

7. The combination set forth in claim 6 wherein said sequencing circuit means comprises a first circuit interconnected with said cyclic control circuit means for determining the exact order in which the machining operations are to be carried out beginning with the first operation and precluding performance of any one of the operations until the proper tool therefor has been removed from its receiver, and second circuit means interconnected with said circuit means for indicating the working tool next to be used in the machine.

8. In a single spindle machine tool for performing a series of machining operations using a plurality of tools in a predetermined sequence, the combination comprising, means for controlling the machine tool to carry out the various machining operations, a rack defining a plurality of receivers for holding the respective tools used in the machine, sequencing means connected to said control means for initially preventing the performance of all machining operations of a predetermined series except the first operation thereof, follow-up means connected between said tool receivers and said sequencing means for operating the latter to condition said machine tool control means to carry out said first machining operation upon removal of the first machining operation tool from its receiver, and said sequencing means being responsive to completion by the machine tool of a machining operation to preclude the performance of all but the next successive machining operation of the series.

9. For use with a single spindle machine tool control circuit having a plurality of sequence switches operable in a predetermined order to cause the machine to perform a predetermined succession of machining operations by a series of tools of different sizes, a tool rack having a plurality of tool receivers conformed to fit only the respective ones of said tools, a rack switch mounted on said rack at each receiver, means connecting each rack switch with its respective receiver to be operated by a tool in the receiver thereby to sense the pressure of a working tool therein, and circuit means connecting said rack switches with said sequence switches to operate the proper one of said sequence switches when the proper tool is removed from its tool receiver.

References Cited in the file of this patent

UNITED STATES PATENTS 2,303,243    Trythall _____ Nov. 24, 1942